United States Patent
Jackson et al.

(10) Patent No.: US 10,539,371 B2
(45) Date of Patent: Jan. 21, 2020

(54) HEAT TRANSFER DEVICE INCORPORATING A HELICAL FLOW ELEMENT WITHIN A FLUID CONDUIT

(71) Applicant: Qorvo US, Inc., Greensboro, NC (US)

(72) Inventors: Eric Jackson, Moorpark, CA (US); Dylan Murdock, Bend, OR (US)

(73) Assignee: Qorvo US, Inc., Greensboro, NC (US)

( * ) Notice: Subject to any disclaimer, the term of this patent is extended or adjusted under 35 U.S.C. 154(b) by 0 days.

(21) Appl. No.: 15/874,534

(22) Filed: Jan. 18, 2018

(65) Prior Publication Data
US 2018/0202722 A1    Jul. 19, 2018

Related U.S. Application Data

(60) Provisional application No. 62/447,493, filed on Jan. 18, 2017.

(51) Int. Cl.
  *F28F 1/14*  (2006.01)
  *F28F 1/36*  (2006.01)
  *F28D 7/02*  (2006.01)

(52) U.S. Cl.
  CPC ................... *F28D 7/022* (2013.01)

(58) Field of Classification Search
  CPC ....... F28F 7/02; F28F 1/40; F28F 3/12; F22B 1/162; F28D 7/024; F28D 7/022
  USPC ................. 165/80.3, 164, 168, 169
  See application file for complete search history.

(56) References Cited

U.S. PATENT DOCUMENTS

| | | | | |
|---|---|---|---|---|
| 2,993,682 A * | 7/1961 | Huet | ....................... | F22B 1/162 138/38 |
| 4,296,539 A * | 10/1981 | Asami | ....................... | F16L 9/19 165/115 |
| 4,545,429 A * | 10/1985 | Place, Jr. | ................ | F28F 21/04 165/169 |
| 4,893,672 A * | 1/1990 | Bader | ..................... | F28D 7/024 165/163 |
| 5,307,867 A * | 5/1994 | Yasuda | ................... | F28F 13/12 138/38 |
| 7,017,651 B1 * | 3/2006 | Wilson | ................... | H01L 23/473 165/109.1 |
| 9,010,407 B2 * | 4/2015 | Mackenzie | ............... | E03C 1/00 165/141 |
| 2002/0007941 A1 * | 1/2002 | Zhu | ......................... | C10G 9/20 165/177 |
| 2002/0014328 A1 * | 2/2002 | Mitrovic | .................... | F28F 1/40 165/183 |
| 2005/0061473 A1 * | 3/2005 | Fletcher | ................ | F28D 9/0087 165/46 |
| 2007/0017658 A1 * | 1/2007 | Lehman | ............. | H05K 7/20254 165/80.4 |
| 2011/0247794 A1 * | 10/2011 | Arment | ................. | B21C 37/151 165/181 |
| 2013/0126144 A1 * | 5/2013 | Sheu | ......................... | F28F 1/00 165/181 |

(Continued)

*Primary Examiner* — Davis D Hwu
(74) *Attorney, Agent, or Firm* — Winthrow & Terranova, P.L.L.C.

(57) ABSTRACT

A liquid heat transfer device with improved heat transfer into a heating or cooling fluid is disclosed. The heat transfer device incorporates an element which creates a helical flow path through a fluid conduit to more efficiently dissipate heat within a space-constrained environment without increasing the diameter or overall length of the fluid conduit.

20 Claims, 7 Drawing Sheets

(56) References Cited

U.S. PATENT DOCUMENTS

2016/0153682 A1* 6/2016 Vuillerme ............... F22B 1/006
126/658

* cited by examiner

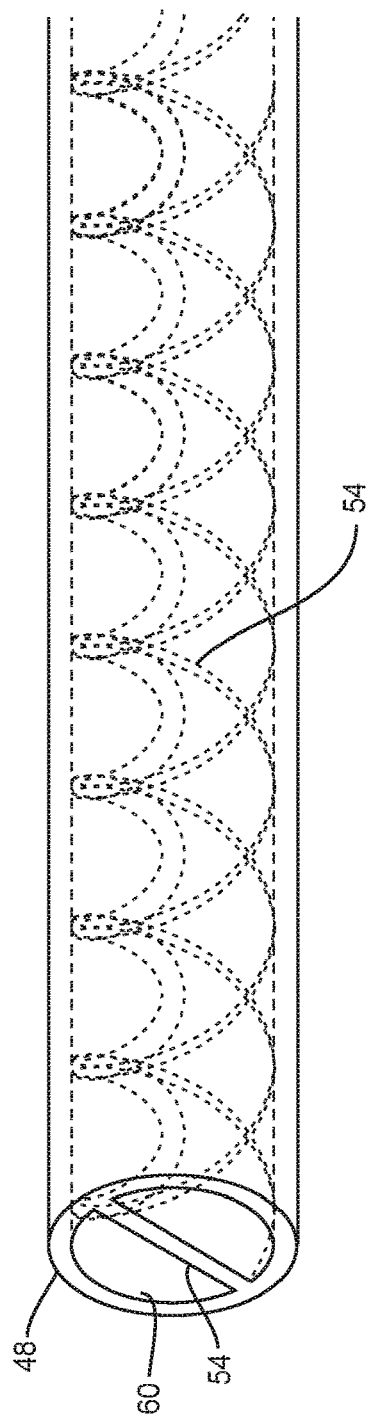
FIG. 4A
FIG. 4B
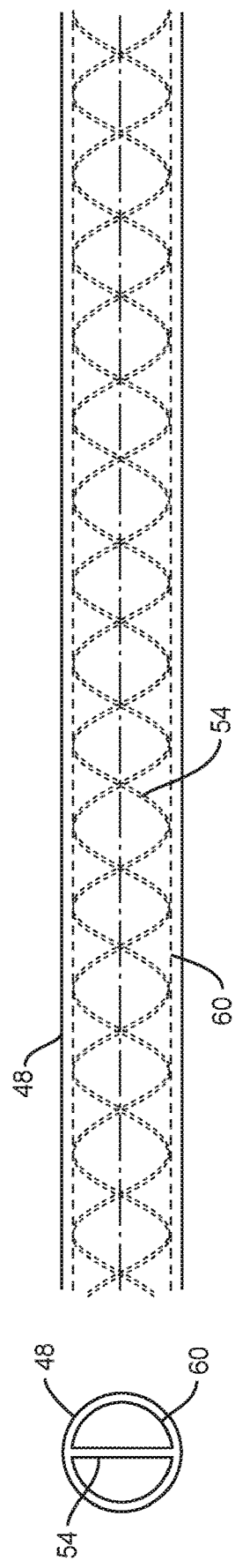
FIG. 4C

HEAT TRANSFER DEVICE INCORPORATING A HELICAL FLOW ELEMENT WITHIN A FLUID CONDUIT

RELATED APPLICATIONS

This application claims the benefit of provisional patent application Ser. No. 62/447,493, filed Jan. 18, 2017, the disclosure of which is hereby incorporated herein by reference in its entirety.

FIELD OF THE DISCLOSURE

This disclosure relates generally to a heat transfer device. More particularly, this disclosure relates to a liquid heat transfer device for an electronic device, incorporating a helical flow element within a fluid conduit.

BACKGROUND

Heat transfer devices, such as heat exchangers, transfer heat between objects. For example, a heat transfer device may transfer heat away from an electronic device for cooling or may transfer heat to a component for heating. Liquid heat transfer devices and heat exchangers incorporate one or more conduits through which a fluid passes to facilitate heat transfer.

Traditional heat transfer devices transfer the greatest amount of heat through portions of the heating and/or cooling fluid (e.g., the working fluid) which are in close proximity to the walls of the fluid conduit. The efficiency of heat transferred between the working fluid and the surrounding materials may be reduced where fluid flows through a traditional fluid conduit with little or no turbulence.

SUMMARY

In applications with high heat flux, it becomes increasingly valuable to efficiently extract heat from an electrical device. The present disclosure aims to increase the performance of a heat transfer device without increasing its size by incorporating a helical flow element into a fluid conduit. The helical flow element structure is designed to increase turbulence of a working fluid to improve heat transfer and effective flow path length inside the fluid conduit without changing the size or length of the conduit.

In an example embodiment, a liquid heat transfer device includes a heat transfer body having a base surface configured to thermally couple to an electronic device, as well as a fluid conduit within the heat transfer body. A helical flow element is disposed within the fluid conduit, which defines a helical shape passing along a length of the fluid conduit. The helical flow element provides at least one helical flow path and is configured to increase turbulence of a fluid passing through the fluid conduit.

In some cases, the liquid heat transfer device further includes a second fluid conduit adjacent the first fluid conduit within the heat transfer body and a second helical flow element disposed within the second fluid conduit. The heat transfer surface may define at least a partially cylindrical cavity. The first fluid conduit and the second fluid conduit may be disposed along a length of the cylindrical cavity. The first fluid conduit and the second fluid conduit may further be arranged radially about a center of the at least partially cylindrical cavity.

The liquid heat transfer device may include an inlet defined within a first outer surface of the heat transfer body and configured to pass the fluid into the first fluid conduit and the second fluid conduit. An outlet is defined within a second outer surface of the heat transfer body and configured to pass the fluid out of the first fluid conduit and the second fluid conduit, and the first outer surface is parallel to the second outer surface and transverse to the base surface.

The liquid heat transfer device may further include an inlet manifold coupled to the inlet, the first fluid conduit, and the second fluid conduit and configured to transfer the fluid from the inlet to the first fluid conduit and to the second fluid conduit. An outlet manifold may be coupled to the outlet, the first fluid conduit, and the second fluid conduit and configured to transfer the fluid from the first fluid conduit and the second fluid conduit to the outlet. The first fluid conduit may instead be connected in series with the second fluid conduit to form a serpentine path between an inlet and an outlet.

In some cases, the helical flow element is formed integrally with the fluid conduit. The helical flow element may instead be formed separate from the fluid conduit and bonded to the fluid conduit. The helical flow element may comprise a thermally conductive material or a thermally insulating material. The heat transfer surface may include a cylindrical cavity about which the fluid conduit is disposed. The helical flow element may further include a multi-fluted helical shape defined about an axis substantially centered within the fluid conduit.

In another example embodiment, a heat exchanger for an electronic device includes a heat transfer body having a base surface, a fluid conduit defined within the heat transfer body and thermally coupled to the base surface, and a flow element disposed within the fluid conduit and extending substantially a length of the fluid conduit. The flow element is configured to increase turbulence of a fluid passing through the conduit as compared to a tubular fluid conduit.

In some cases, the flow element divides the fluid conduit into a first flow path and a second flow path. The first flow path and the second flow paths may be helical about an axis substantially through a center of the fluid conduit. The flow element may further divide the fluid conduit into a third flow path. The first flow path may have a larger volume than the second flow path.

In some cases, the flow element comprises a wavy surface, and the wavy surface causes the increased turbulence. The flow element may further cause fluid to flow along a path longer than the length of the fluid conduit.

Those skilled in the art will appreciate the scope of the present disclosure and realize additional aspects thereof after reading the following detailed description in association with the accompanying drawings.

BRIEF DESCRIPTION OF THE DRAWINGS

The accompanying drawing figures incorporated in and forming a part of this specification illustrate several aspects of the disclosure and, together with the description, serve to explain the principles of the disclosure.

FIG. 4A depicts an isometric view of a fluid conduit, illustrating a helical flow element within the fluid conduit.

FIG. 4B depicts a front view of the fluid conduit of FIG. 4A.

FIG. 4C depicts a side view of the fluid conduit of FIG. 4A.

DETAILED DESCRIPTION

Figure 1A:
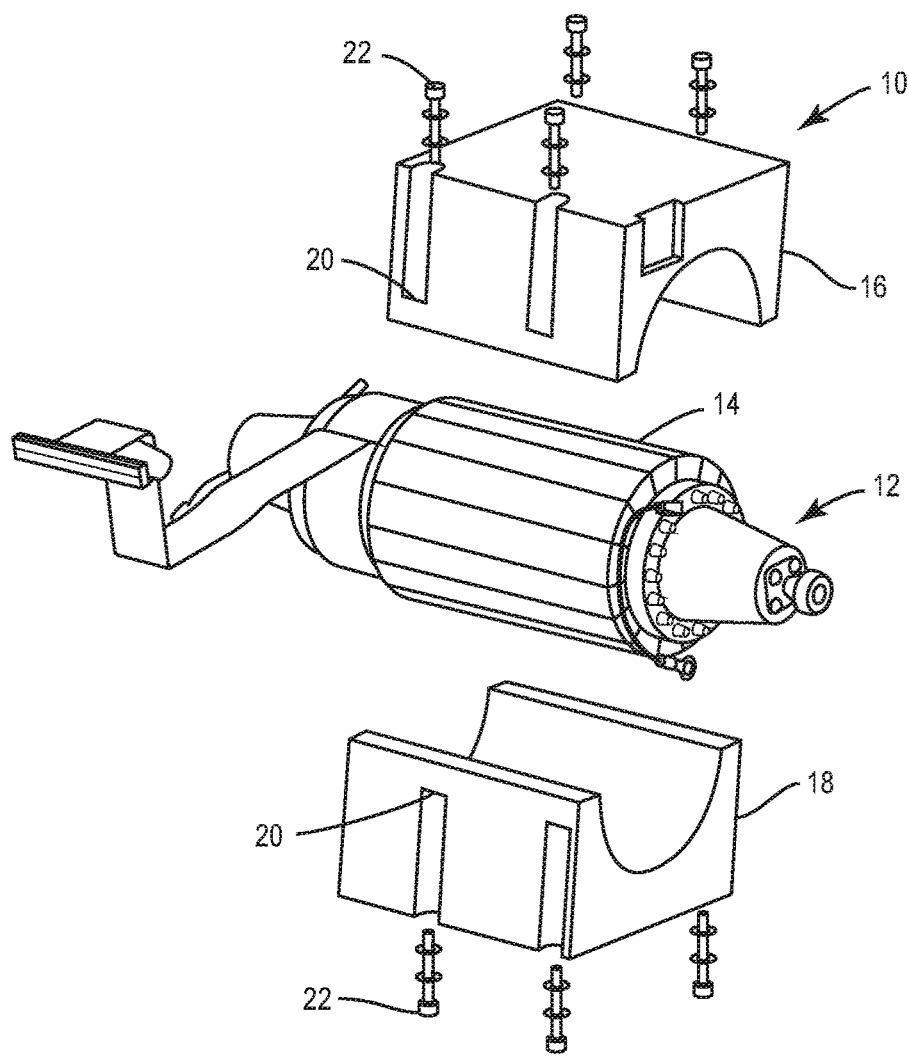
FIG. 1A depicts a high-heat electronic component and an example heat transfer device which may provide heat dissipation.

The present disclosure relates to a heat transfer device with improved heat exchange with a heating or cooling fluid (e.g., a working fluid) which passes through a fluid conduit of the heat transfer device. More specifically, a high-heat electronic device, such as a processing unit, a solid state amplifier, a switch, or a similar device may require rapid and efficient heat dissipation. Moreover, the high-heat electronic component may be within a space-constrained environment, requiring efficient heat transfer without increasing the diameter or overall length of the fluid conduit.

Liquid heat transfer devices greatly increase the rate of heat dissipated over air-cooled devices, such as heat sinks. A traditional liquid heat exchanger incorporates fluid conduits having a simple tubular geometry. As a working fluid passes through the fluid conduit, heat is transferred into the working fluid and away from the electronic device.

The device of the present disclosure improves the rate of heat transfer into the working fluid by creating at least one helical flow path through a fluid conduit. The helical flow path greatly increases the distance the fluid travels before exiting the fluid conduit, and also increases turbulence within the fluid conduit, thereby improving the rate of heat transfer into the working fluid.

A fluid conduit incorporating a helical flow path may be used in direct cooling of high-power products. For example, a high-power spatial power combining device (SPCD), such as a Qorvo® Spatium® spatial power combining device, may generate high heat load, dissipation, or flux within a signal amplifying region. A heat transfer device may be thermally coupled to the SPCD to dissipate heat therefrom.

The heat transfer device may incorporate at least one fluid conduit, and a helical flow element may be disposed within the fluid conduit to create at least one helical flow path through the fluid conduit. Embodiments may incorporate one or multiple helical flow paths through the fluid conduit by using a single-fluted or multi-fluted helical flow element. In some embodiments, the fluid conduit may take a serpentine path along a length of the heat transfer device. Additionally or alternatively, the heat transfer device may include multiple fluid conduits arranged along or about a base surface in thermal contact with the electronic device.

An example heat transfer device may be used for a cylindrically-shaped SPCD. The base surface of the heat transfer device may form a cylinder, or partial cylinder, about the SPCD. Fluid conduits may be disposed along a length of the cylindrical base surface, with multiple parallel fluid conduits or portions of a fluid conduit arrayed radially about the base surface.

The helical flow element of the present disclosure may also be incorporated into other heat transfer devices, such as a cold plate for a high-power processor or other device. In a cold plate, one or multiple fluid conduits may form serpentine paths through the cold plate in order to further dissipate heat.

These and other embodiments are discussed below with reference to FIGS. 1A-5B. However, those skilled in the art will readily appreciate that the detailed description given herein with respect to these Figures is for explanatory purposes only and should not be construed as limiting.

The present description is generally discussed in terms of heat transfer devices in which heat is dissipated away from an electronic device. It should be understood that heat dissipation is discussed for exemplary purposes, and that the present disclosure is not limited to heat dissipation of an electronic device. For example, the present disclosure further contemplates heat accumulation, as well as and heating and cooling devices for devices other than electronic devices.

Figure 1B:
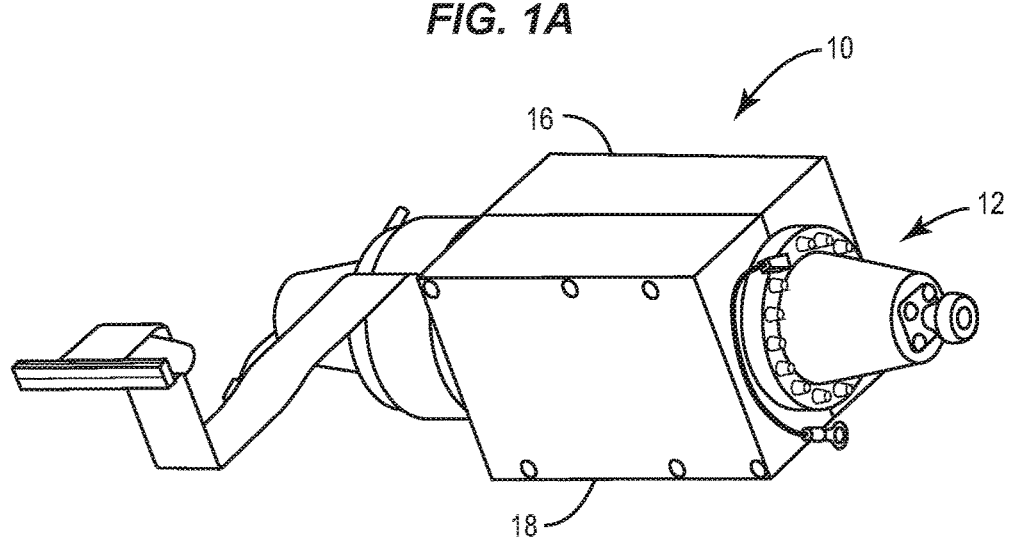
FIG. 1B depicts the high-heat electronic component having the heat transfer device coupled thereto.

FIGS. 1A and 1B depict an example high-heat electronic device at least partially enveloped by a heat transfer device 10 in accordance with the present disclosure. The electronic device may be an SPCD 12 using longitudinally parallel, stacked wedge shaped amplifier assemblies. The amplifier assemblies are stacked together to form a coaxial waveguide, the center waveguide section 14, which in the illustrated case is cylindrical. The SPCD 12 is further described below with respect to FIG. 2.

The amplifier assemblies of the center waveguide section 14 may generate significant heat, and the heat transfer device 10 may dissipate heat from the center waveguide section 14. As illustrated, a heat transfer device 10 may include a pair of separable halves 16, 18 defining a cavity therebetween, the cavity having a shape which conforms to the outer shape of the center waveguide section 14, which in the illustrated case is cylindrical.

The halves 16, 18 of the heat transfer device 10 may be separable from each other and/or the center waveguide section 14, as illustrated in FIG. 1A. When assembled, the halves 16, 18 of the heat transfer 10 may substantially encompass the center waveguide section 14, as illustrated in FIG. 1B.

Each half 16, 18 of the heat transfer device 10 may include one or more flanges 20, channels, or other attachment features through which screws 22 or other fastening means pass to retain the halves 16, 18 together. When mated together, the heat transfer device 10 defines a cylindrical or other shaped cavity conforming to the outer shape of the center waveguide section 14.

The heat transfer device 10 is a liquid heat transfer device, in which a working fluid passes through at least one fluid conduit disposed within the body of the heat transfer device 10. The size and number of fluid conduits may be determined by the amount of heat to be dissipated. According to the present disclosure, a fluid conduit may define a helical flow path through the heat transfer device 10, such as described in further detail with respect to FIGS. 3A-4G.

The heat transfer device 10 may also operate to clamp the amplifier assemblies of the center waveguide section 14 together, making for a robust device even when significant vibration or other insult are encountered. In some embodiments, thermal grease or another appropriate material can be used to fill any gaps between the halves 16, 18 of the heat transfer device 10.

It will be appreciated that the heat transfer device 10 is not limited to two halves 16, 18; rather, the heat transfer device 10 may incorporate more or less than two subparts. In some examples, the heat transfer device 10 may be formed as a single piece, which may be opened on a side to accommodate the SPCD 12, or the heat transfer device 10 may define a cylindrical cavity without openings and the SPCD 12 may be formed within the cavity. In addition, other connections of the subparts of the heat transfer device 10 and different manufacturing techniques can be used.

In some embodiments, the heat transfer device 10 may take a different form. For example, the heat transfer device 10 may be shaped to accommodate another electronic device. As another example, the heat transfer device 10 may be formed as a cold plate or other heat exchanger, such as described in further detail with respect to FIGS. 5A-5B.

Figure 2:
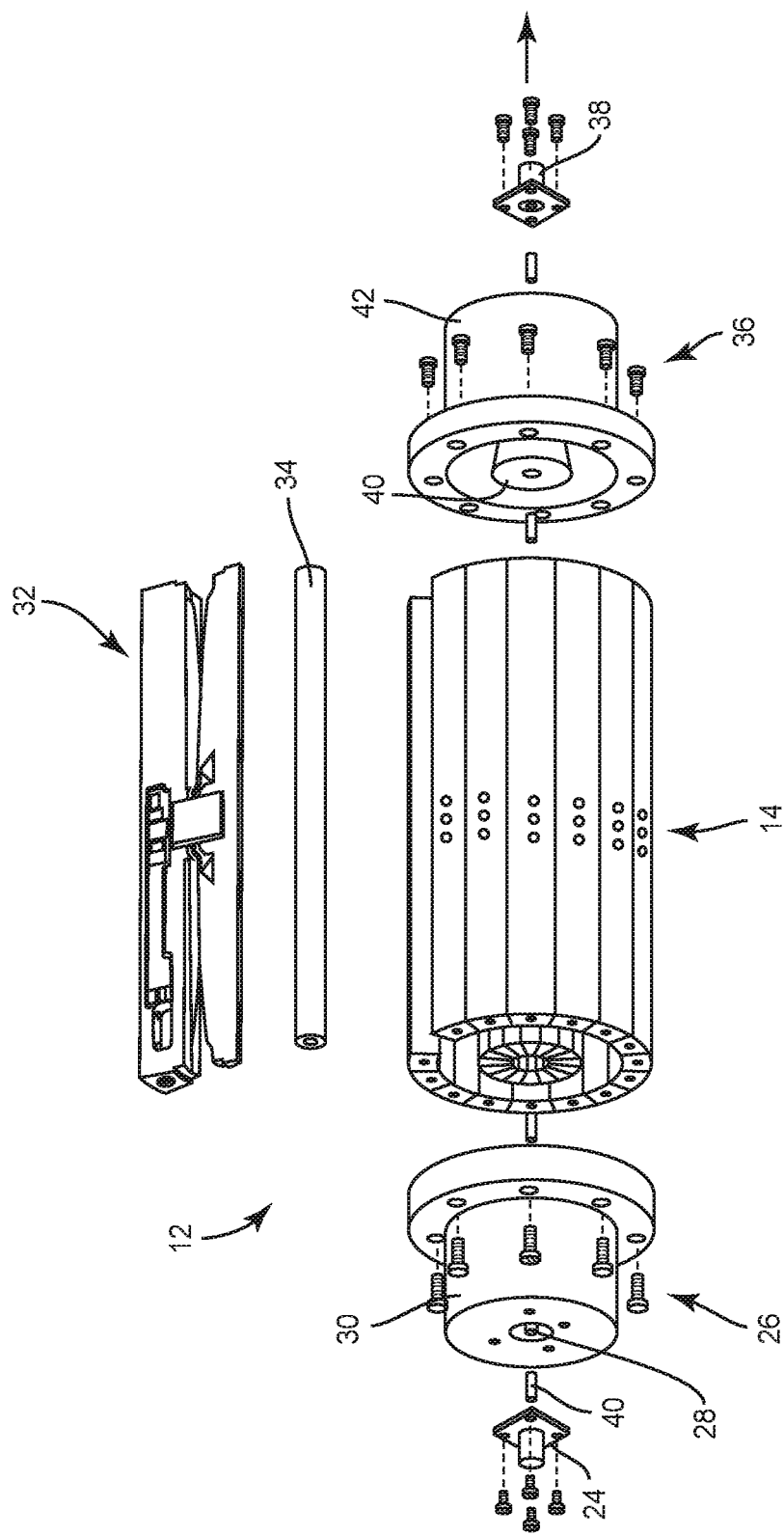
FIG. 2 depicts an exploded view of the example high-heat electronic component, a spatial power combining device.

FIG. 2 depicts an exploded view of the SPCD 12 depicted in FIGS. 1A and 1B. The SPCD 12 includes an input port 24 and an input coaxial waveguide section 26. The input coaxial waveguide section 26 provides a broadband transition from the input port 24 to the center waveguide section 14. Electrically, the input coaxial waveguide section 26 provides broadband impedance matching from an impedance of the input port 24 to an impedance of the center waveguide section 14. Outer surfaces of an inner conductor 28 and an inner surface of an outer conductor 30 have gradually changed profiles configured to minimize the impedance mismatch from the input port 24 to the center waveguide section 14.

The center waveguide section 14 comprises a plurality of amplifier assemblies 32 and a cylindrical post 34 that has a major longitudinal axis that is coincident with a central longitudinal axis of the center waveguide section 14. The plurality of amplifier assemblies 32 may be positioned circumferentially around the post 34. Each amplifier assembly 32 includes a body having a predetermined wedge-shaped cross-section and an arcuate outer surface. When the amplifier assemblies 32 are assembled together, they form a cylinder with a cylindrical central cavity which accommodates the post 34.

The SPCD 12 also includes an output coaxial waveguide section 36 and an output port 38. The input port 24 and the output ports 38 may be field replaceable Subminiature A (SMA) connectors. In other embodiments, the input port 24 and the output port 38 may be super SMA connectors, type N connectors, K connectors, or any other suitable connectors. The output coaxial waveguide section 36 provides a broadband transition from the center waveguide section 14 to the output port 38. Electrically, the output coaxial waveguide section 36 provides broadband impedance matching from the impedance of the center waveguide section 14 to an impedance of the output port 38. Outer surfaces of an inner conductor 40 and an inner surface of an outer conductor 42 have gradually changed profiles configured to minimize the impedance mismatch from the center waveguide section 14 to the output port 38.

The post 34 connects with the inner conductors 28, 40 by way of screws on opposite ends of the post 34. The post 34 is provided for simplifying mechanical connections, and may have other than a cylindrical shape or be omitted altogether. The flanges of the input port 24 and output port 38 are screwed to the outer conductors 30, 42 with one or more screws each, although other types of fasteners may be used. Pins may be used to connect between centers of the input port 24 and the output port 38 and inner conductors 28, 40. The pins can be omitted, such as if the input/output ports 24, 38 already have center pins that can be mounted into inner conductors 28, 40.

Generally, the center waveguide section 14 of the SPCD 12 generates a heat flux during operation. The heat flux may be concentrated particularly around an amplifier within each amplifier assembly 32. Allowing heat to accumulate within the center waveguide section 14 may lead to reduced performance, damage of the SPCD 12, and/or failure of one or more amplifier assemblies 32. Accordingly, the center waveguide section 14 may require direct and rapid heat dissipation.

Figure 3A:
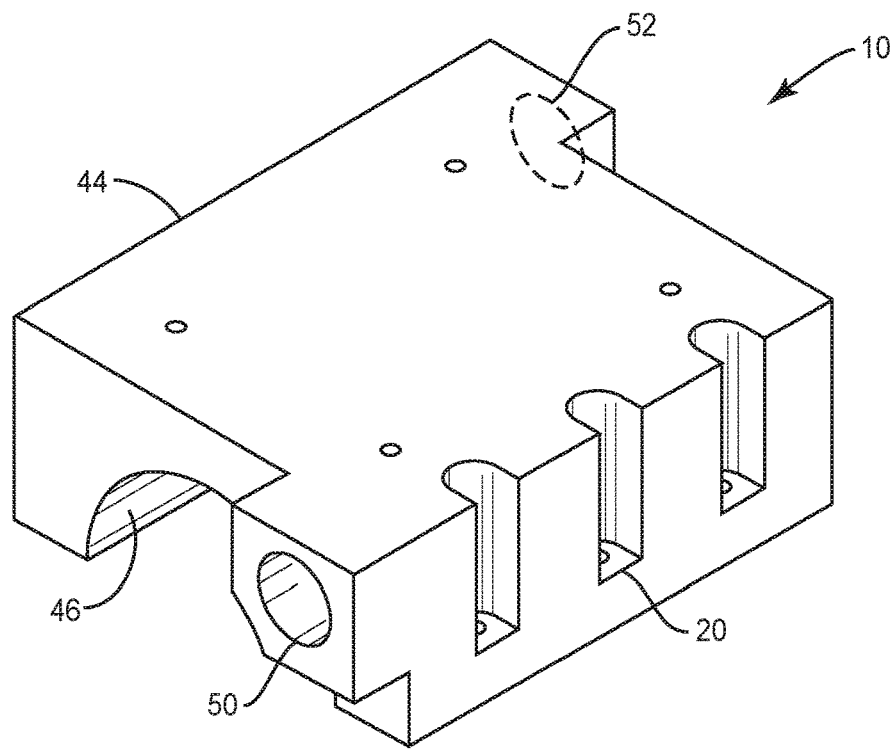
FIG. 3A depicts the heat transfer device.
Figure 3B:
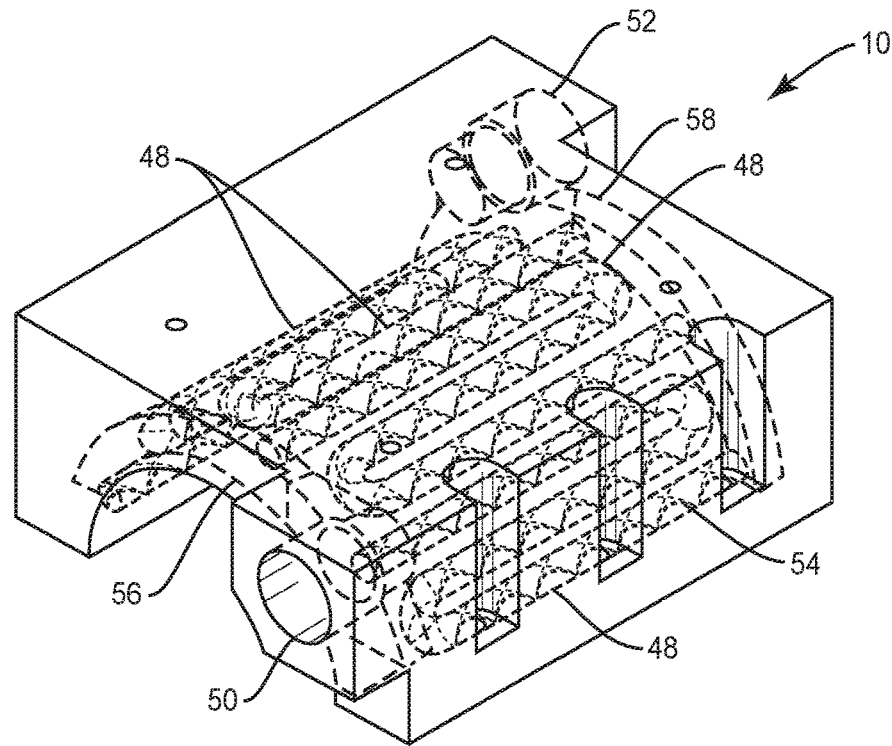
FIG. 3B depicts a transparent view of the heat transfer device, illustrating fluid conduits incorporating a helical flow element.

Turning to FIGS. 3A and 3B, the heat transfer device 10 may be shaped to accommodate the center waveguide section 14 of the SPCD 12. FIG. 3A depicts an isometric view of the heat transfer device 10, while FIG. 3A depicts a transparent view of the heat transfer device. In some embodiments, the heat transfer device 10 may include two or more portions configured to clamp to an electronic device. Each portion of the heat transfer device 10 may be considered to be an independent heat transfer device or as interdependent portions of a larger heat transfer device.

The heat transfer device 10 includes a heat transfer body 44. The heat transfer body 44 is generally formed from a thermally conductive material, such as a metal (e.g., aluminum, copper, brass, steel), ceramic, graphite, a thermally conductive polymer, thermally conductive fibers, and so on. The heat transfer body 44 includes a base surface 46 which thermally couples the heat transfer body 44 to an electronic device, such as the SPCD 12. As illustrated, the base surface 46 may be shaped to accommodate the device requiring heat dissipation; in this case, a partial cylindrical shape. Other embodiments may form an entire cylinder or another geometric shape to match the shape of the base surface 46 to the device requiring heat dissipation.

The heat transfer body 44 may further include one or more flanges 20, through which portions of the heat transfer device 10 may removably couple together and/or through which the heat transfer body 44 may removably couple to an electronic device. In the example depicted, the flanges 20 may be positioned adjacent to a partially cylindrical base surface 46. Thus the heat transfer body 44 may couple to a corresponding body to form a cylindrical cavity to accommodate an electronic device, such as the SPCD 12. The flanges 20 may further receive screws or other fasteners to retain the heat transfer body 44 to the corresponding body or the electronic device.

The heat transfer device 10 further defines one or more fluid conduits 48 through which a working fluid, such as a cooling fluid, passes through the heat transfer device 10. An inlet 50 may be defined in an outer surface of the heat transfer body 44, and the working fluid may enter the heat transfer device 10 through the inlet 50. As illustrated in FIG. 3B, the fluid may then pass through the one or more fluid conduits 48, before exiting the heat transfer body 44 at an outlet 52 defined in another outer surface, which may be on an opposite side of the heat transfer body 44.

The inlet 50 and outlet 52 may be shaped to interface with fluid tubes to deliver working fluid into the inlet 50 and carry fluid away from the outlet 52. For example, the outlet 52 may connect to a fluid tube which conducts the working fluid to a radiator or other secondary heat exchanger, after which an additional fluid tube returns the working fluid to the inlet 50. Accordingly, the inlet 50 and outlet 52 may be shaped to interface with such fluid tubes. In some embodiments, the inlet 50 and/or outlet 52 may further be shaped (e.g., with a beveled edge, a groove, and so on) to incorporate an o-ring, gasket, or other sealing element to maintain a liquid seal between the inlet 50/outlet 52 and a connecting fluid tube.

The heat transfer device 10 may operate to dissipate heat by transferring heat from an electronic device into the heat transfer body 44 through the base surface 46. Heat may further be transferred into the working fluid as the working fluid moves through the fluid conduits 48 in the heat transfer body 44. Thus fluid which exits the outlet 52 may have a significantly higher temperature than fluid which enters the inlet 50 of the heat transfer body 44.

In order to improve the operation of the heat transfer device 10, a helical flow element 54 may be disposed within one or more fluid conduits 48. The helical flow element 54 may create one or more helical flow paths within the fluid conduit(s) 48. Passing the fluid through the helical flow path(s) may increase turbulence and thereby increase the efficiency at which the heat transfer device 10 transfers heat into the working fluid, as described further below with respect to FIGS. 4A-4G.

As illustrated in FIG. 3B, in many embodiments the heat transfer body 44 includes multiple fluid conduits 48. The fluid conduits 48 may be disposed about the cylindrical base surface 46 to increase thermal coupling with the base surface 46, or the fluid conduits 48 may be otherwise arranged, such as in a rectilinear pattern. In some embodiments, each fluid conduit 48 may follow an elongated serpentine path, as illustrated in FIG. 3B. In other embodiments, the fluid conduits 48 may form multiple, non-serpentine parallel paths or take another path.

In some embodiments, an inlet manifold 56 may distribute incoming working fluid from the inlet 50 into the one or more fluid conduits 48. An outlet manifold 58 may then recombine outgoing fluid from the fluid conduits 48 into the outlet 52. In other embodiments, multiple inlets 50 or multiple outlets 52 may pass fluid through the fluid conduits 48, with or without the use of manifolds 56, 58. In still other embodiments, a single fluid conduit 48 may take a serpentine or otherwise shaped path from the inlet 50, through the heat transfer body 44, and to the outlet 52.

The fluid conduits 48, inlet manifold 56, and outlet manifold 58 may be formed integrally with the heat transfer body 44 by an appropriate technique, such as using an etchable or otherwise removable mold. Alternatively, the heat transfer body 44 may comprise two or more molded, cast, or otherwise shaped pieces which are brazed, soldered, welded, pressed, epoxied, glued, mechanically locked, or otherwise bonded together to form the fluid conduits 48, inlet manifold 56, and outlet manifold 58. In other embodiments, the fluid conduits 48, inlet manifold 56, and outlet manifold 58 may be formed separately (e.g., using a material with a higher melting point than the heat transfer body 44) and cast into or otherwise embedded within the heat transfer body 44.

In some embodiments, the one or more fluid conduits 48 of the heat transfer body 44 may further interface with fluid conduits in another component. For example, in embodiments in which the heat transfer body 44 couples with another body to for a cylindrical cavity for an electronic device, the fluid conduits 48 may interface with fluid conduits in the other body. Such an interface may be defined adjacent the flanges 20, passing working fluid between portions of the heat transfer device 10, such as the heat transfer body 44. The interface may further include sealing elements, such as one or more o-rings, gaskets, or the like, to maintain a liquid seal across the interface.

Figure 4D:
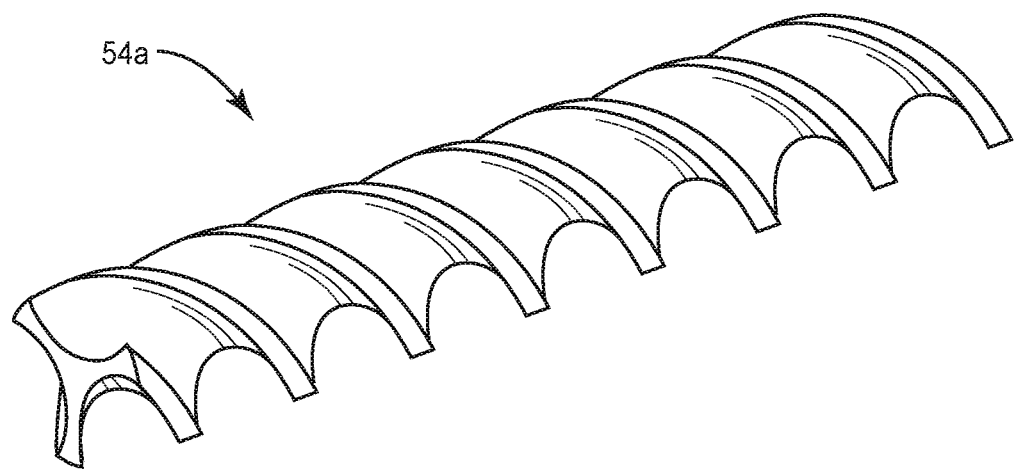
FIG. 4D depicts an alternative helical flow element having three helical flow paths.
Figure 4E:
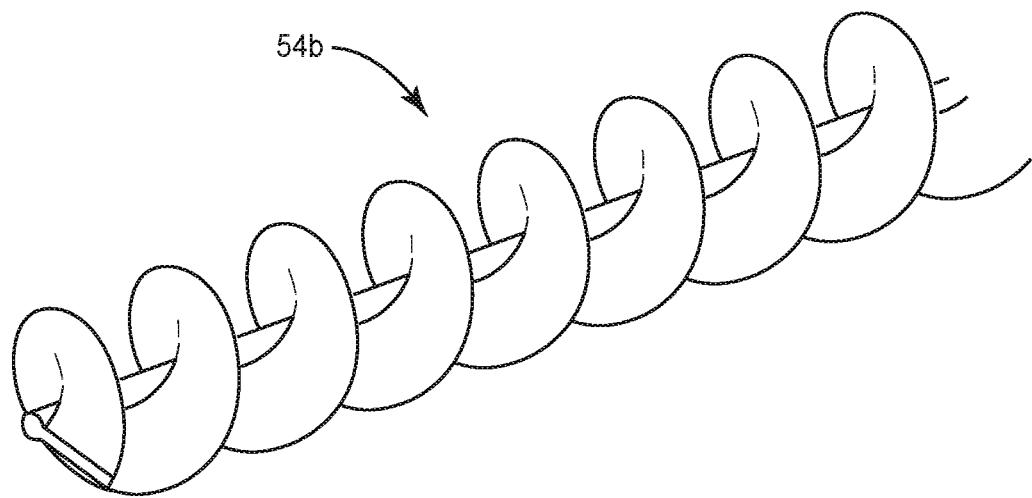
FIG. 4E depicts another alternative helical flow element having a single helical flow path.
Figure 4F:
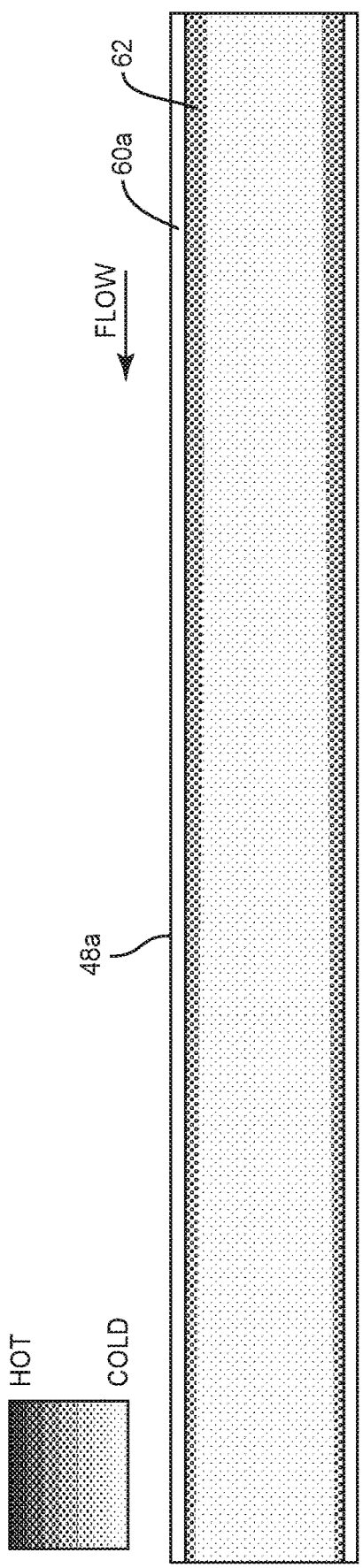
FIG. 4F depicts a representation of heat flow through a traditional fluid conduit.
Figure 4G:
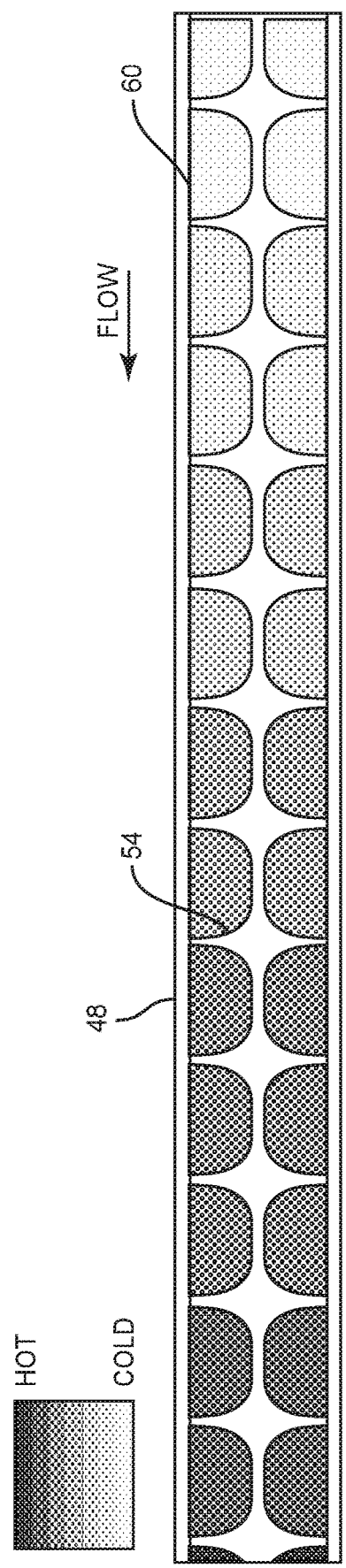
FIG. 4G depicts a representation of heat flow through a fluid conduit incorporating a helical flow element.

FIGS. 4A-4F depict the helical flow element 54 of an example fluid conduit 48 and operation of the same in greater detail. FIGS. 4A-4C depict various views of an example fluid conduit 48 incorporating a helical flow element. FIGS. 4D-4E depict exemplary alternative designs for a helical flow element. FIGS. 4F-4G depict representations of heat transfer operations in a traditional fluid conduit and a fluid conduit incorporating a helical flow element.

As depicted in FIGS. 4A-4C, the helical flow element 54 is disposed within an example fluid conduit 48, which may be within a heat transfer body 44. The fluid conduit 48 may be one of multiple fluid conduits 48, and may extend along a linear path, a serpentine path, or otherwise as described above. The fluid conduit 48 may define a cylindrical cavity, with a wall 60 of the cavity being formed from a metal or other thermally conductive material, such as the same material as the heat transfer body 44.

In some embodiments, the helical flow element 54 may be formed integral with the heat transfer body 44 and the fluid conduit 48 or formed through additive manufacturing. In other embodiments, the helical flow element 54 may be formed separate from the heat transfer body 44 and the fluid conduit 48, and may be placed within or bonded to the wall 60 of the fluid conduit 48. In such cases the helical flow element 54 may be bonded to the wall 60 through an appropriate technique, such as brazing, soldering, welding, adhesive, epoxy, and so on.

The helical flow element 54 may be formed from a thermally conductive material, though this is not required. The helical flow element 54 may be formed from a metal (e.g., the same or a different metal from the heat transfer body 44) and machined, twisted, cast, or otherwise shaped to form a helical pattern, such as illustrated in FIGS. 4A-4E. In some embodiments, the helical flow element 54 may be formed from a non-metal and/or thermally insulating material (e.g., a plastic, a polymer, and so on) and molded or otherwise shaped to form a helical pattern.

As illustrated in FIGS. 4A-4C, the helical flow element 54 may divide the fluid conduit 48 into two helical paths through which a working fluid passes. The helical paths may increase an amount of turbulence in the fluid while maintaining a desirable rate of fluid flow through the fluid conduit 48, thus improving the rate of heat transfer into the fluid.

The helical flow element 54 may be considered a two-fluted helical flow element 54, as it creates two flow paths through the fluid conduit 48. Other helical flow elements 54 may be implemented. For example, a three-fluted helical flow element 54a may divide the fluid conduit 48 into three helical flow paths as illustrated in FIG. 4D. In another example, a single-fluted helical flow element 54b may form a single helical flow path through the fluid conduit 48 as illustrated in FIG. 4E. Other embodiments may include four or more fluted helical flow elements.

In some embodiments, the one or more flow paths may symmetrically divide the fluid conduit 48 and may have a helical shape about an axis centered within the fluid conduit 48, such as depicted in FIGS. 4A-4E. In other embodiments, one flow path may be larger (e.g., have a larger volume) than the other, and/or the flow paths may not follow an axis centered within the fluid conduit 48.

Turning to FIGS. 4F and 4G, the improved heat transfer operation of an example fluid conduit 48 incorporating a helical flow element 54 is illustrated. FIG. 4F depicts a representation of heat flow through a traditional tubular fluid conduit 48a, while FIG. 4G depicts a similar representation of heat flow through a fluid conduit 48 incorporating a helical flow element 54. In both figures, liquid flows through the fluid conduit 48, 48a from right to left, and heavier shading indicates higher heat while lighter shading indicates lower heat.

As depicted in FIG. 4F, as fluid flows through a tubular fluid conduit 48a, the fluid experiences little turbulence. As a consequence, heat exchange may primarily occur between the wall 60a and fluid near the wall 60a, forming a thermal boundary layer 62. The efficiency of heat exchange into the fluid may be limited, as fluid away from the thermal boundary layer 62 may experience little heat exchange. The thermal boundary layer 62 may decrease in size as fluid travels through the fluid conduit 48a, further reducing the efficiency of heat exchange into the fluid.

As depicted in FIG. 4G, the heat exchange process is improved by including the helical flow element 54 within the fluid conduit 48. As fluid passes through a helical flow path, turbulence in the fluid causes the boundary layer 62 to be broken up, resulting in a higher rate of heat transfer into the fluid. In addition, the helical path travels a longer distance than the length of the traditional tubular fluid conduit 48a. As a result, heat is dissipated throughout the fluid conduit 48, with the fluid gaining temperature as it flows through the fluid conduit 48. Once fluid exits the fluid conduit 48 and the heat transfer body 44, the fluid may be cooled through a radiator or other secondary heat exchanger before returning to the fluid conduit 48.

While the above embodiments are discussed in respect to a helical flow element 54, creating a helical flow path through a fluid conduit 48, it should be understood that the present disclosure is not limited to these embodiments. Any structure which increases turbulence within the fluid conduit 48 may be used. For example, a flow element may not be helical in shape, but may instead have a wavy surface (e.g., a periodic or aperiodic sinusoid-like surface) or another texture. In other embodiments, one or a series of protruding structures may be disposed on a flow element or a wall 60 of the fluid conduit 48, and so forth. These structures may similarly improve heat exchange by increasing turbulence through the fluid conduit 48 and breaking up the boundary layer 62.

Figure 5A:
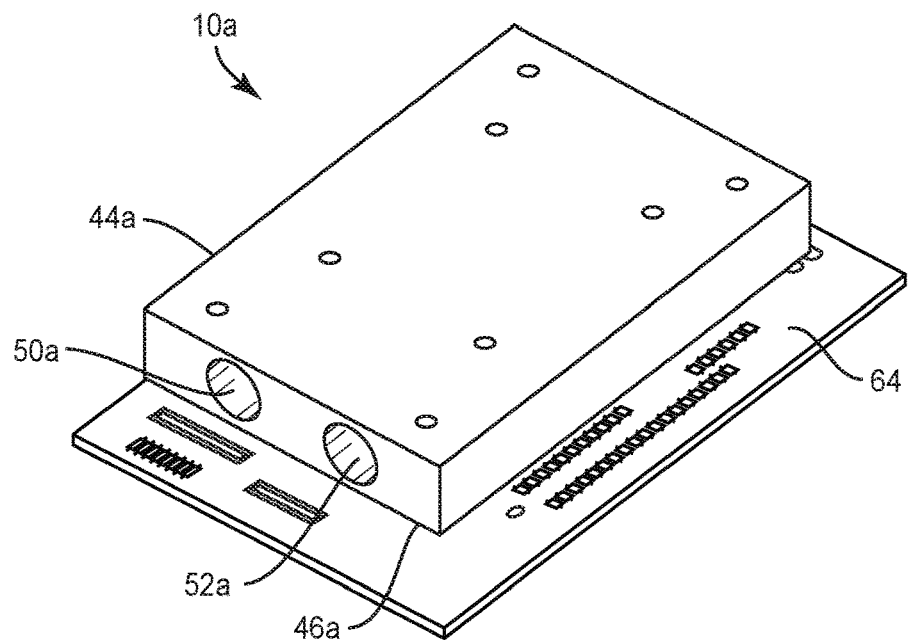
FIG. 5A depicts another example heat transfer device, a cooling or heating plate for an integrated circuit or other flat surface.
Figure 5B:
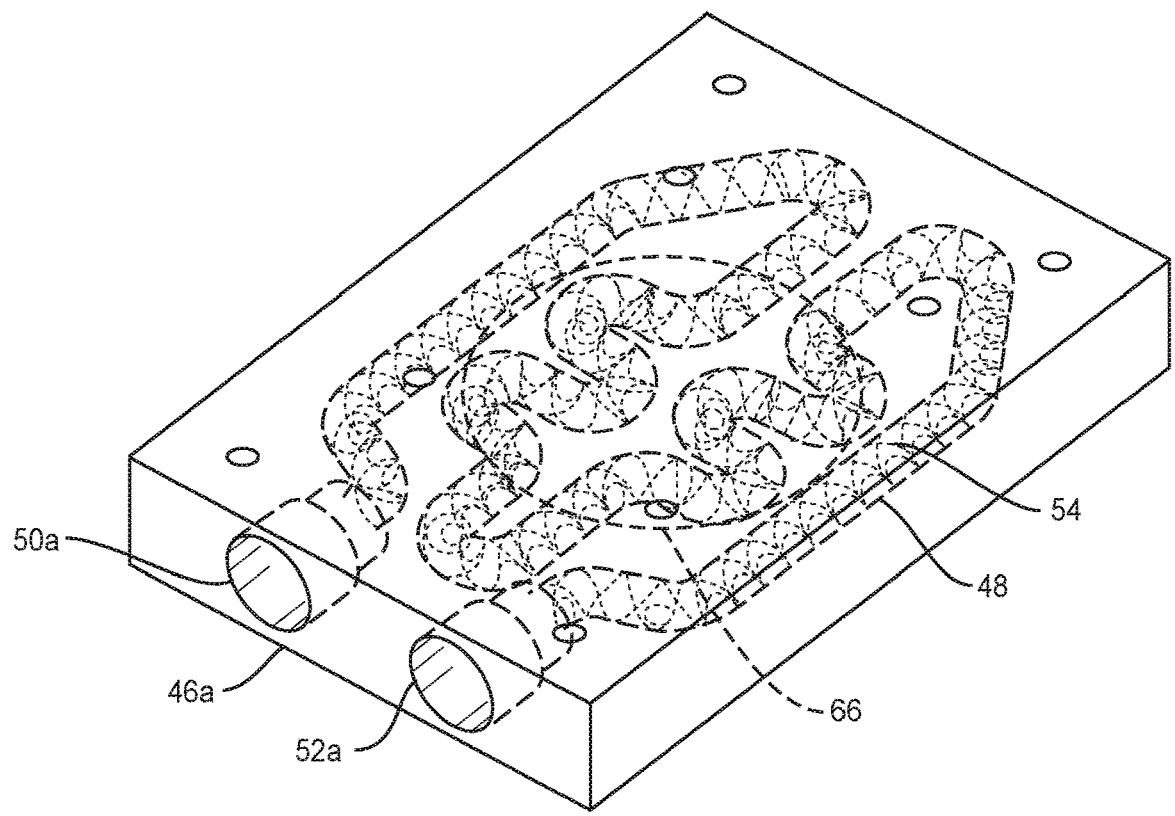
FIG. 5B depicts the heat transfer device of FIG. 5A, illustrating fluid conduits incorporating a helical flow element.

Turning to FIGS. 5A and 5B, a heat transfer device 10a may take another form and/or be operable to exchange heat with other types of electronic devices or non-electronic devices. For example, the heat transfer device 10a may be a cooling or heating plate for an integrated circuit 64 or another object having a flat surface with high heat flux.

The heat transfer device 10a includes a heat transfer body 44a. The heat transfer body 44a is generally formed from a thermally conductive material, such as described above with respect to FIGS. 3A-3B. The heat transfer body 44a includes a base surface 46a which thermally couples the heat transfer body 44a to an electronic device, such as the integrated circuit 64 to cool one or more components, such as a processing device, an amplifier, a switch, and so on.

The heat transfer device 10a further defines a fluid conduit 48, which may form a serpentine path through which working fluid passes between an inlet 50a and an outlet 52a. The inlet 50a and the outlet 52a may be openings in an outer surface of the heat transfer body 44a, or the inlet 50a and the outlet 52a may be disposed in distinct outer surfaces of the heat transfer body 44a. In some embodiments, the heat transfer device 10a may include multiple fluid conduits 48 and/or one or more manifolds, similar to the embodiment depicted in FIGS. 3A-3B.

The helical flow element 54 may be disposed within all or a portion of the fluid conduit 48, and may further be as described above with respect to FIGS. 3A-4G. As illustrated in FIG. 3B, in many embodiments the fluid conduit 48 may form a serpentine path which is disposed along the base surface 46a. The path of the fluid conduit 48 may be particularly concentrated at a high heat region 66, passing multiple times through the high heat region 66 in order to further dissipate heat.

It should be understood that the features and components of the heat transfer device 10 depicted and described with reference to FIGS. 1A-4G, and the features and components of the heat transfer device 10a depicted and described with reference to FIGS. 5A-5B may be interchangeable and are not limited only to those shown. Further examples are considered within the scope of this disclosure which combine, subtract, or substitute the features and components described herein.

Those skilled in the art will recognize improvements and modifications to the present disclosure. All such improvements and modifications are considered within the scope of the concepts disclosed herein.

What is claimed is:

1. A liquid heat transfer device, comprising:
a heat transfer body having a base surface configured to thermally couple to an electronic device;
a first fluid conduit for a working fluid within the heat transfer body;
a first helical flow element disposed within the first fluid conduit and defining a helical shape which passes along a length of the first fluid conduit;
a second fluid conduit adjacent the first fluid conduit within the heat transfer body; and
a second helical flow element disposed within the second fluid conduit;
wherein:
the first helical flow element provides at least one helical flow path; and
the first helical flow element is configured to increase turbulence of the working fluid passing through the first fluid conduit.

2. The liquid heat transfer device of claim 1, wherein:
the base surface of the heat transfer body defines an at least partially cylindrical cavity; and
the first fluid conduit and the second fluid conduit are disposed along a length of the at least partially cylindrical cavity.

3. The liquid heat transfer device of claim 2, wherein the first fluid conduit and the second fluid conduit are arranged radially about a center of the at least partially cylindrical cavity.

4. The liquid heat transfer device of claim 1, further comprising:
an inlet defined within a first outer surface of the heat transfer body and configured to pass the working fluid into the first fluid conduit and the second fluid conduit; and
an outlet defined within a second outer surface of the heat transfer body and configured to pass the working fluid out of the first fluid conduit and the second fluid conduit;
wherein the first outer surface is parallel to the second outer surface and transverse to the base surface.

5. The liquid heat transfer device of claim 4, further comprising:
an inlet manifold coupled to the inlet, the first fluid conduit, and the second fluid conduit and configured to transfer the working fluid from the inlet to the first fluid conduit and to the second fluid conduit; and an outlet manifold coupled to the outlet, the first fluid conduit, and the second fluid conduit and configured to transfer the working fluid from the first fluid conduit and the second fluid conduit to the outlet.

6. The liquid heat transfer device of claim 1, wherein the first fluid conduit is connected in series with the second fluid conduit to form a serpentine path between an inlet and an outlet.

7. The liquid heat transfer device of claim 1, wherein the first helical flow element is formed integrally with the first fluid conduit.

8. The liquid heat transfer device of claim 1, wherein the first helical flow element is formed separate from the first fluid conduit and bonded to the first fluid conduit.

9. The liquid heat transfer device of claim 8, wherein the first helical flow element comprises a thermally conductive material.

10. The liquid heat transfer device of claim 1, wherein the first helical flow element comprises a thermally insulating material.

11. The liquid heat transfer device of claim 1, wherein the base surface of the heat transfer body comprises a cylindrical cavity and the first fluid conduit is disposed about the cylindrical cavity.

12. The liquid heat transfer device of claim 1, wherein the first helical flow element comprises a multi-fluted helical shape which is defined about an axis substantially centered within the first fluid conduit.

13. A heat exchanger for an electronic device, comprising:
a heat transfer body having a base surface;
a fluid conduit for a working fluid defined within the heat transfer body and thermally coupled to the base surface; and
a flow element disposed within the fluid conduit and extending substantially a length of the fluid conduit;
wherein:
the flow element is configured to increase turbulence of the working fluid passing through the fluid conduit as compared to a tubular fluid conduit; and
the flow element divides the fluid conduit into a first flow path, a second flow path, and a third flow path.

14. The heat exchanger of claim 13, wherein the first flow path and the second flow path are helical about an axis substantially through a center of the fluid conduit.

15. The heat exchanger of claim 13, wherein the first flow path has a larger volume than the second flow path.

16. The heat exchanger of claim 13, wherein
the flow element comprises a wavy surface; and
the wavy surface causes the increased turbulence.

17. The heat exchanger of claim 13, wherein the flow element causes the working fluid to flow along a path longer than the length of the fluid conduit.

18. A heat exchanger for an electronic device, comprising:
a heat transfer body having a base surface;
a first fluid conduit for a working fluid defined within the heat transfer body and thermally coupled to the base surface;
a first flow element disposed within the first fluid conduit and extending substantially a length of the first fluid conduit;
a second fluid conduit defined within the heat transfer body; and
a second flow element disposed within the second fluid conduit;
wherein the first flow element is configured to increase turbulence of the working fluid passing through the first fluid conduit as compared to a tubular fluid conduit.

19. The heat exchanger of claim 18, wherein:
the base surface of the heat transfer body defines an at least partially cylindrical cavity;
the first fluid conduit and the second fluid conduit are disposed along a length of the at least partially cylindrical cavity; and
the first fluid conduit and the second fluid conduit are arranged radially about a center of the at least partially cylindrical cavity.

20. The heat exchanger of claim 18, wherein the first fluid conduit is connected in series with the second fluid conduit to form a serpentine path between an inlet and an outlet.

* * * * *